United States Patent [19]

Hopple et al.

[11] 3,987,834

[45] Oct. 26, 1976

[54] TIRE BUFFING APPARATUS AND METHOD

[75] Inventors: Victor H. Hopple, Greenville, S.C.; Richard H. Niehaus, Cincinnati, Ohio

[73] Assignee: American Manufacturing & Equipment, Inc., Cincinnati, Ohio

[22] Filed: June 23, 1975

[21] Appl. No.: 589,450

[52] U.S. Cl. ................................................ 157/13
[51] Int. Cl.² ...................................... B29H 17/40
[58] Field of Search ...................................... 157/13

[56] References Cited
UNITED STATES PATENTS

| | | | |
|---|---|---|---|
| 2,961,039 | 11/1960 | Glaze | 157/13 |
| 3,528,476 | 9/1970 | Hawkinson | 157/13 |
| 3,584,673 | 6/1971 | Lehmann | 157/13 |
| 3,675,706 | 7/1972 | Cahill | 157/13 |

Primary Examiner—Al Lawrence Smith
Assistant Examiner—James G. Smith
Attorney, Agent, or Firm—Bailey, Dority & Flint

[57] ABSTRACT

A tire buffing apparatus is illustrated having a tire mounting means carried on a platform movable in and out on a path substantially normal to a driven rasp for engaging and disengaging the tire with respect to the rasp, wherein a fluid operated cylinder is pivotably mounted on the platform and has a piston rod pivotally connected to the tire mounting means. The method contemplates buffing the tire beginning in a medial portion of the crown of the tire and moving the tire in a first motion with respect to the rasp for buffing that portion between the medial portion through a shoulder on one side and then taking the tire out of engagement with the rasp and returning same to the initial position prior to engaging the tire with the rasp and buffing that portion of the tire surface on the other side of the medial portion.

9 Claims, 3 Drawing Figures

TIRE BUFFING APPARATUS AND METHOD

BACKGROUND OF THE INVENTION

This invention relates to tire buffing apparatus of the type wherein a template or cam is utilized in connection with a cam follower or follow bar for moving the tire carried by a tire mount with respect to a tire buffing rasp in a path corresponding to the surface of the cam. Such a device is illustrated in U.S. Pat. No. 3,675,706 but possesses the disadvantage of being complicated requiring a chain and driving arrangement for pivoting the tire mount, as well as additional mechanism for Moving the rasp forwardly to engage the tire, the tire mount being mounted on a pivot fixed with respect to the machine frame.

Manually operated devices of the aforesaid type have been constructed wherein the tire mount is carried on a slideable platform and wherein the rasp is stationary. Such devices, however, are extremely tedious to operate due to the repetitive action necessitated by a tire buffing operation wherein the tires are buffed for later recapping.

Normally, when tires are buffed in the devices presently on the market, the buffing operation begins with a medial portion of the crown of the tire in engagement with the rasp and the tire is then moved so as to buff that portion on one side of the medial portion of the crown through the shoulder, and then with the tire still in engagement with the rasp a full traverse is made from shoulder to shoulder. Thus, the already buffed portion on one side of the tire is maintained in engagement with the rasp during the initial portion of the full traverse. The tire is subjected to additional heat and additional rubber, albeit a smaller amount, is removed causing the tire to be somewhat uneven from side to side.

Accordingly, it is an important object of this invention to provide a power operated buffing apparatus utilizing the simplicity of a fluid operated cylinder for moving the periphery of a tire in a predetermined path with respect to a rasp rotating on a stationary axis.

Another important object of the invention is to produce an apparatus which lends itself to the practice of a novel method wherein approximately one-half of the tire on one side is buffed with removal of the tire from the rasp prior to the return of the tire to an initial central position prior to buffing through the shoulder on the other side of the tire.

BRIEF DESCRIPTION OF THE INVENTION

It has been found that by utilizing a tire mount carried by a platform movable along a path normal to the rasp and normally biased toward the rasp by a yielding force, that a hydraulic cylinder pivotally carried by the platform and pivotally connected to the tire mount produces through a cam and cam follower arrangement, a predetermined desired movement of the periphery of the tire with respect to the rasp.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

Figure 1:
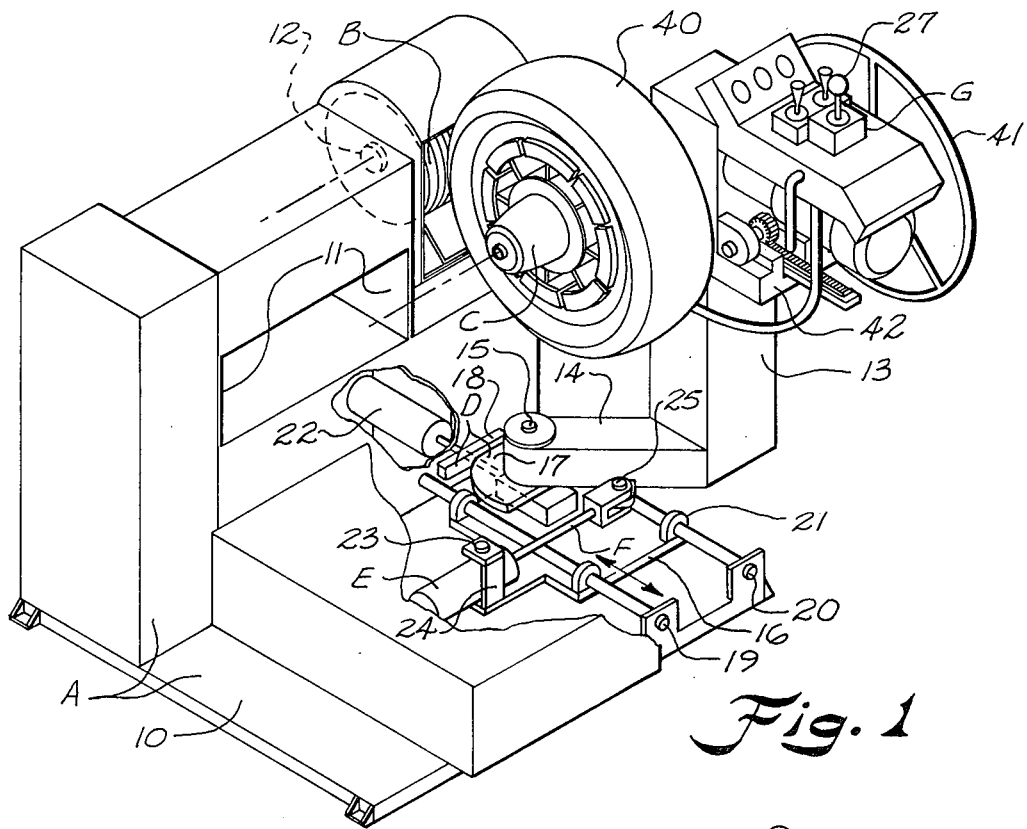
FIG. 1 is a perspective view, with parts broken away, illustratng a tire buffing apparatus constructed in accordance with the presention wherein the method of the invention may be utilized as described herein.
Figure 2:
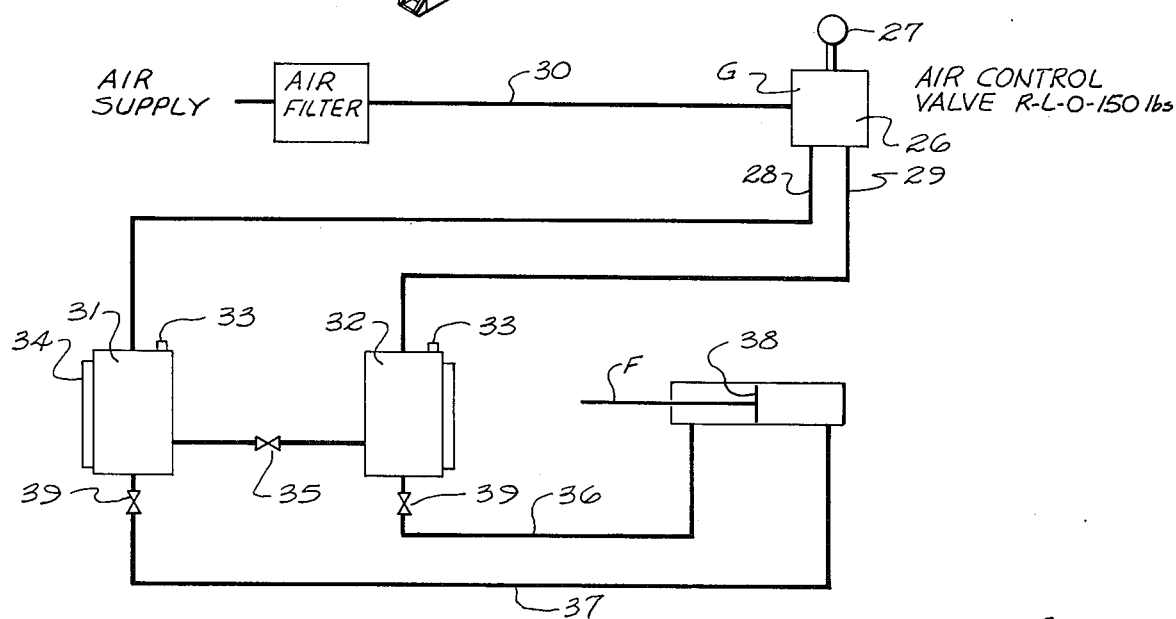
FIG. 2 is a schematic diagram illustrating the hydraulic mechanism for operating the cylinder of the present invention.

The drawing illustrates a tire buffing apparatus having a frame A. A driven rasp B is mounted for rotation on a horizontal shaft carried by the frame. Means C rotating a tire in operating engagement with the rasp are carried by the frame. Co-acting cam and cam follower means D are carried by the frame and by the means rotating a tire for moving the tire with respect to the rasp in a path corresponding to the configuration of the outer periphery of the tire. An elongated substantially horizontal cylinder E has pivotal mounting carried by said frame positioning the cylinder for movement in a substantially horizontal plane. A piston in the cylinder has a piston rod F carried by the cylinder which extends outwardly of one end of the cylinder with a pivotal connection adjacent the free end of the Piston rod to the means rotating the tire. Pressurized fluid means G are selectively connected to the cylinder on each side of the piston for imparting movement to the means rotating the tire in a horizontal plane moving the tire in a desired path with respect to the rasp thereby buffing the tire.

The frame A of the tire buffing apparatus includes a base 10 together with suitable vertical frame members 11 for carrying means (not shown) for supplying power to drive the rasp B which is mounted for rotation on a horizontal shaft 12 suitably carried for rotation by the vertical frame 11.

Means C are provided in the form of a driven tire mount carried on a horizontal axis adjacent an upper end of a standard 13 for carrying a tire for movement into operating engagement with the rasp B.

It will be observed that the standard is carried by a horizontal arm 14 adjacent one end thereof while the other end is pivoted as at 15 on a platform 16 for movement toward and away from the rasp in a path substantially normal to the horizontal axis of the rasp as illustrated by the arrow in FIG. 1.

Co-acting cam and cam follower means D are carried by the frame and by the platform adjacent the means rotating the tire for moving the tire with respect to the rasp in a path corresponding to the configuration of the outer periphery of the tire. The cam or template, is illustrated at 17 and the cam follower, or follow bar, is designated at 18. The cam 17 is fixed with respect to the adjacent end of the arm 14. The cam follower 18 is fixed upon the frame 11. It will be observed that a pair of spaced trackways 19 and 20 are provided for carrying respective collars 21 fixed adjacent the four corners of the platform 16 for moving the platform responsive to the dictates of the cam and cam follower. In this connection, it will be noted that the platform 16 is normally biased toward the rasp by a yieldable force exerted by the fluid operated cylinder 22 carried by the frame 11 and having operable connection to the platform. An elongated substantially horizontal cylinder E has pivotal mounting on said platform as at 23. The pivotal mounting 23 is carried by vertical support 24 carried by the platform 16. The hydraulic cylinder E has a piston rod F extending therefrom and its end remote from the cylinder is pivotally connected as at 25 with respect to the arm 14, the pivot 25 being fixed with respect to the arm 14.

Pressurized fluid means G include an air control valve 26 for selective connection to the cylinder on each side of the piston for imparting a movement to the means rotating the tire in a horizontal plane moving the tire in a path responsive to the dictates of the surface of the cam with respect to the rasp thereby buffing the tire. The valve 26 is indicated, for example, schematically as including a lever 27 for connection to the cylinder E through lines 28 and 29 for left or right movement of the piston at a regulated pressure of from zero to one hundred fifty pounds. Air is supplied to the valve 26 from an air supply through an air filter and the line 30 to the valve G. Each of the tanks 31 and 32 are provided with an air relief valve 33 and a sight gauge 34 which through a level valve 35 provide hydraulic fluid through the lines 36 and 37 to selected sides of the piston 38 thus moving the piston rod F producing movement in a desired direction in the tire mounting apparatus. It will be observed that a fluid adjustable flow valve 38 may be provided in each of the lines 36 and 37.

Figure 3:
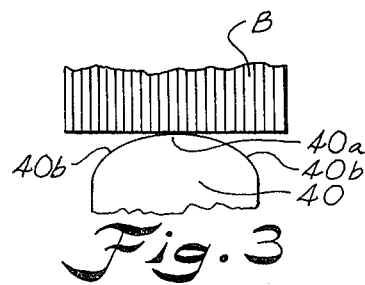
FIG. 3 is a schematic side elevation illustrating the periphery of the tire in engagement with the rasp at a medial portion thereof.

Referring Now in particular to FIG. 3, it will be noted that a tire 40 having a crown 40a which tapers on each side through shoulders 40b, is illustrated as being in engagement in a medial portion with the rasp B. A medial portion of the crown of the tire is first buffed to a desired depth of cut with the tire engaging the rasp. The tire is then moved with respect to the rasp, with the tire in engagement progressively buffing the tire from the medial portion through the shoulder of the tire on one side of the medial portion. The tire is then moved away from the rasp and with the tire thus disengaged is moved with respect to the rasp in an opposite direction until the medial portion is again opposite the rasp. Then the tire is moved with respect to the rasp and in engagement therewith, through a progressive buffing of the tire from the medial portion through the shoulder of the tire on the other side thereof. It will be observed that the buffing action is substantially evenly distributed over the tire and the tire is not subjected to a repetitious passage with respect to the already buffed portion thereof as is normally the case when buffing tires preparatory to recapping. In carrying out the operation of moving the tire away from the rasp, the wheel 41 is turned causing the mounting mechanism, guided by the usual trackway 42, to be moved with respect to the standard 13 away from the rasp B.

While a preferred embodiment of the invention has been described using specific terms, such description is for illustrative purposes only, and it is to be understood that changes and variations may be made without departing from the spirit or scope of the following claims.

What is claimed is:

1. In a tire buffer apparatus having a frame, a driven rasp mounted for rotation on a horizontal axis carried by said frame; a platform carried by said frame for movement toward and away from said rasp in a path substantially normal to said horizontal axis, yieldable means normally exerting a force urging said platform toward said rasp along said path, a horizontal arm pivoted adjacent one end thereof for movement in a horizontal plane on said platform, a vertical standard carried adjacent the other end of said horizontal arm, a driven tire mount carried on a horizontal axis adjacent an upper end of said standard for carrying a tire for movement into operating engagement with said rasp; coacting cam and cam follower means carried by said frame and by said platform for moving said tire with respect to said rasp in a path corresponding to the configuration of the outer periphery of said tire, the improvement comprising: an elongated substantially horizontal cylinder; a pivotal mounting carried by said platform positioning said cylinder for movement in a substantially horizontal plane; a piston in said cylinder; a piston rod carried by said cylinder adjacent one end extending outwardly of one end of said cylinder; a pivotal connection adjacent the other end of said piston rod carried by said horizontal arm intermediate its ends; and pressurized fluid means selectively connected to said cylinder on each side of said piston for imparting movement to said arm in said horizontal plane moving said tire in said path with respect to said rasp thereby buffing the tire.

2. The structure set forth in claim 1, wherein said pressurized fluid means includes a manually operated valve delivering hydraulic fluid at variable pressures to the cylinder on selected sides of said piston.

3. The structure set forth in claim 2, wherein said valve is an air valve for exerting variable air pressures to a pair of tanks containing hydraulic fluid, each tank being connected to the cylinder on a respective side of said piston.

4. The structure set forth in claim 3 wherein each tank is connected to the cylinder through a fluid adjustable flow valve.

5. A power operated tire buffer apparatus comprising: a frame; a driven rasp mounted for rotation on a horizontal axis carried by said frame; means including a driven tire mount frame rotating a tire in operating engagement with said rasp carried for movement in a horizontal plane by said frame; co-acting cam and cam follower means carried by said frame and by said means rotating a tire for moving said tire in a horizontal plane with respect to said rasp in a path corresponding to the configuration of the outer periphery of said tire; an elongated substantially horizontal cylinder; a pivotal mounting carried by said frame positioning said cylinder for movement in a substantially horizontal plane; a piston in said cylinder; a piston rod carried by said cylinder adjacent one end extending outwardly of one end of said cylinder; a pivotal connection adjacent the other end of said piston rod to said means rotating a tire; pressurized fluid means connected to said cylinder for imparting movement to said means rotating a tire in a horizontal plane moving said tire in said path with respect to said rasp thereby buffing the tire.

6. A tire buffing apparatus comprising a frame; a driven rasp mounted for rotation on a horizontal axis carried by said frame; a platform carried for movement toward and away from said rasp in a path substantially normal to said horizontal axis; yieldable means normally exerting a force urging said platform toward said rasp along said path; a horizontal arm pivoted adjacent one end thereof for movement in a horizontal plane on said platform; a vertical standard carried by said frame adjacent the other end of said horizontal arm; a driven tire mount carried on a horizontal axis adjacent an upper end of said standard for carrying a tire for movement into operating engagement with said rasp; coacting cam and cam follower means carried by said frame and by said platform for moving said tire with respect to said rasp in a path corresponding to the configuration of the outer periphery of said tire; an elongated substantially horizontal fluid operated cylinder; a pivotal mounting carried by said platform positioning said cylinder for movement in a substantially horizontal plane; a piston in said cylinder; a piston rod carried by said cylinder adjacent one end thereof extending outwardly of one end of said cylinder a pivotal connection adjacent the other end of said piston rod carried by said horizontal arm intermediate its ends; and pressurized fluid means selectively connected to said cylinder on each side of said piston for imparting movement to said arm in said horizontal plane moving said tire in said path with respect to said rasp thereby buffing the tire.

7. The structure set forth in claim 6, including spaced parallel trackways for carrying said platform along said path.

8. The method of buffing a tire utilizing a driven rotating tire buffing rasp preparatory to recapping of the tire comprising the steps of:
   buffing a medial portion of the crown of the tire to a desired depth of cut by engaging the tire with the rasp;
   progressively buffing the tire, by relative movement between the tire and the rasp with the tire and the rasp in engagement, from said medial portion through the shoulder of the tire on one side of said medial portion;
   then disengaging the tire and the rasp;
   with the tire and the rasp disengaged, moving the tire relative to the rasp in an opposite direction until said medial portion is opposite said rasp; and
   then progressively buffing the tire, by relative movement between the tire and the rasp with the tire and rasp in engagement, from said medial portion through the shoulder of the tire on the other side of said medial portion;
   whereby the buffing action is substantially evenly distributed over the tire while subjecting the tire to less heat.

9. The method of buffing a tire utilizing a driven rotating tire buffing rasp preparatory to recapping of the tire comprising the steps of:
   buffing a medial portion of the crown of the tire to a desired depth of cut by engaging the tire with the rasp;
   moving the tire with respect to the rasp, with the tire in engagement with the rasp, progressively buffing the tire from said medial portion through the shoulder of the tire on one side of said medial portion;
   then moving the tire away from the rasp;
   with the tire and the rasp disengaged, moving the tire with respect to the rasp in an opposite direction until said medial portion is opposite said rasp; and
   then moving the tire with respect to the rasp, with the tire in engagement with the rasp, progressively buffing the tire from said medial portion through the shoulder of the tire on the other side of said medial portion;
   whereby the buffing action is substantially evenly distributed over the tire while subjecting the tire to less heat.

* * * * *